UNITED STATES PATENT OFFICE.

EUGENE N. RIOTTE, OF SAN FRANCISCO, CALIFORNIA, ASSIGNOR OF FIVE-FOURTEENTHS INTEREST TO CHARLES A. STETEFELDT, OF SAME PLACE, AND FIVE-FOURTEENTHS TO JOHN H. BOALT, OF SANDUSKY, OHIO.

IMPROVEMENT IN CHLORIDIZING SILVER ORES.

Specification forming part of Letters Patent No. 113,208, dated March 28, 1871.

I, EUGENE N. RIOTTE, of the city of San Francisco and State of California, have invented a certain Improved Process for Chloridizing Silver Ores, of which the following is a specification:

I hereby declare the following to be a full, clear, and exact description of my improved process for chloridizing silver ores, which will enable any person skilled in the art to which it appertains to practice it.

The nature of my invention consists in dropping a mixture of pulverized silver ore and salt through a vertical, or nearly vertical, shaft with the products of combustion, whereby an almost instantaneous chlorination of the silver is effected.

I take any silver ore and mix it with from four to eight per cent. of its weight of common salt, more or less, according to the richness of the ore, after which I pulverize the mixture to the degree of fineness commonly required to prepare ore for amalgamation.

In order to accomplish an intimate mixture of the ore and salt, I prefer to crush them together in a dry-crushing battery. I then introduce this mixture into the top of a furnace, the shaft of which is vertical, or nearly vertical, and which is heated by fire-places at or near the top, so that a current of heated air, gases, and other products of combustion is continually descending through the shaft. Care must be taken to introduce the mixture so that it shall fall in separate and finely-divided particles, and not in lumps. As the pulverized mixture falls with the current, the ore and salt are both instantly decomposed, the action of the heat separating the silver from the sulphur, antimony, or other substances combined or mixed with it, and the salt being also at the same time decomposed by the gases which are formed by the decomposition of the ore. The chlorine of the salt then instantly unites with the silver, so that the chlorination of the silver is completed in less than two seconds.

I do not confine myself to the exact proportions of ore and salt specified above, as they are not essential to my process; but I state those proportions which I have found to be most advantageous in practice.

I do not claim, broadly, chloridizing silver ores by combining salt or other chlorine compound with the ore and heating them while floated through a shaft or flue, as that is covered by the patents of Charles Stetefeldt, December 31, 1867, reissue January 25, 1871.

This process of chloridizing silver ores may be used in the furnaces patented by Messrs. James D. Whelpley and Jacob J. Storer, No. 41,250, January 12, 1864, and No. 59,696, November 13, 1866; and the pulverized ore and salt may be either dropped into the shaft or blown in by means of a fan-blast.

What I claim as new, and desire to secure by Letters Patent of the United States, is—

The process of chloridizing silver ore by dropping a mixture of pulverized ore and salt through a vertical, or nearly vertical, shaft with the products of combustion.

EUGENE N. RIOTTE.

Witnesses:
H. L. JOACHIMSEN,
B. J. BURNS.